(12) United States Patent
Remez et al.

(10) Patent No.: US 12,206,994 B2
(45) Date of Patent: Jan. 21, 2025

(54) IMAGE CAPTURE SYSTEMS UTILIZING ADJUSTABLE ILLUMINATION

(71) Applicant: Apple Inc., Cupertino, CA (US)

(72) Inventors: Roei Remez, Tel Aviv (IL); Refael Della Pergola, Jerusalem (IL); Dror Leshem, Maale Efraim (IL); Yuval Tsur, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 17/903,810

(22) Filed: Sep. 6, 2022

(65) Prior Publication Data

US 2024/0080569 A1    Mar. 7, 2024

(51) Int. Cl.
*H04N 23/74* (2023.01)
*G06T 7/50* (2017.01)
*G06T 7/70* (2017.01)

(52) U.S. Cl.
CPC ............ *H04N 23/74* (2023.01); *G06T 7/50* (2017.01); *G06T 7/70* (2017.01); *G06T 2207/10048* (2013.01); *G06T 2207/30201* (2013.01)

(58) Field of Classification Search
None
See application file for complete search history.

(56) References Cited

U.S. PATENT DOCUMENTS

| 7,452,087 | B2 | 11/2008 | Imade |
| 7,524,097 | B2 | 4/2009 | Turnbull et al. |
| 7,530,709 | B2 | 5/2009 | Kikuchi et al. |
| 7,637,639 | B2 | 12/2009 | Epstein |
| 8,021,006 | B2 | 9/2011 | Shyu et al. |
| 8,388,190 | B2 | 3/2013 | Li et al. |
| 8,564,004 | B2 | 10/2013 | Tarsa et al. |
| 8,761,594 | B1 * | 6/2014 | Gross ............... G01S 7/4817 396/155 |
| 8,786,207 | B2 | 7/2014 | Huang et al. |

(Continued)

FOREIGN PATENT DOCUMENTS

| CN | 205507328 | 8/2016 |
| CN | 206162029 | 5/2017 |

(Continued)

OTHER PUBLICATIONS

U.S. Appl. No. 17/851,294, filed Jun. 28, 2022, Alaimo, et al.

*Primary Examiner* — Cynthia Segura
(74) *Attorney, Agent, or Firm* — Brownstein Hyatt Farber Schreck, LLP

(57) ABSTRACT

Various embodiments disclosed herein include devices, systems, and methods for spatially controlling illumination provided by a flash module. The flash module includes a flash controller that controls light emitters of an emitter array according to an illumination profile. The illumination profile is selected to reduce a relative brightness to a target region of the flash module's field of illumination. The target region is associated with a portion of a target object identified in the field of illumination. In some instances, the target region corresponds to a portion of a user's eye that is positioned within the field of illumination. In other instances, the flash module is incorporated into a device, and the target region corresponds to a reflected image of a portion of the device that is positioned within the field of illumination.

20 Claims, 12 Drawing Sheets

(56) References Cited

U.S. PATENT DOCUMENTS

| | | |
|---|---|---|
| 9,046,634 B2 | 6/2015 | Shchekin et al. |
| 9,109,781 B2 | 8/2015 | Holder |
| 9,470,406 B2 | 10/2016 | Catalano |
| 9,699,377 B2 * | 7/2017 | You .................. G06T 7/521 |
| 9,798,070 B2 | 10/2017 | Van Bommel et al. |
| 9,946,055 B2 | 4/2018 | Krijn et al. |
| 9,964,283 B2 | 5/2018 | Kataoka |
| 10,009,527 B2 | 6/2018 | Jagt et al. |
| 10,142,554 B2 * | 11/2018 | Ryu .................. G06T 7/50 |
| 10,222,540 B2 | 3/2019 | Hikmet et al. |
| 10,420,177 B2 | 9/2019 | Stopa et al. |
| 10,423,050 B2 | 9/2019 | Yoshida |
| 10,690,986 B2 | 6/2020 | Firka et al. |
| 10,837,619 B2 | 11/2020 | Jiang |
| 10,871,268 B2 | 12/2020 | Jagt et al. |
| 10,924,686 B2 | 2/2021 | Antretter et al. |
| 11,013,079 B2 | 5/2021 | Jurik et al. |
| 11,016,192 B2 * | 5/2021 | Pacala .................. G01S 17/10 |
| 11,022,297 B2 | 6/2021 | Shum |
| 11,131,438 B2 | 9/2021 | Potter et al. |
| 11,251,347 B2 | 2/2022 | Streppel et al. |
| 11,287,727 B2 | 3/2022 | Weaver et al. |
| 11,333,953 B2 | 5/2022 | Song et al. |
| 11,361,460 B2 * | 6/2022 | Schrama .................. G06T 7/557 |
| 11,435,044 B2 | 9/2022 | Owoc et al. |
| 11,627,262 B2 * | 4/2023 | Stec .................. G06F 21/32 |
| | | 348/164 |
| 2004/0091255 A1 | 5/2004 | Chase et al. |
| 2008/0123350 A1 | 5/2008 | Choe et al. |
| 2009/0116210 A1 | 5/2009 | Cutler et al. |
| 2009/0278979 A1 | 11/2009 | Bayerl et al. |
| 2013/0335821 A1 | 12/2013 | Robinson et al. |
| 2015/0227025 A1 * | 8/2015 | Park .................. H05B 45/22 |
| | | 348/371 |
| 2018/0091710 A1 | 3/2018 | Huang et al. |
| 2021/0136298 A1 * | 5/2021 | Stec .................. H04N 23/20 |
| 2022/0217252 A1 * | 7/2022 | Kang .................. H04N 23/55 |
| 2022/0415863 A1 * | 12/2022 | Masui .................. H01L 33/56 |
| 2023/0086557 A1 | 3/2023 | Alaimo et al. |
| 2023/0359274 A1 * | 11/2023 | Krukowski .......... G02B 27/0093 |

FOREIGN PATENT DOCUMENTS

| | | |
|---|---|---|
| CN | 207006046 | 2/2018 |
| CN | 108253339 | 7/2018 |
| CN | 209592076 | 11/2019 |
| CN | 105785691 | 9/2020 |
| CN | 112466859 | 3/2021 |
| CN | 113824895 | 12/2021 |
| DE | 102009034841 | 2/2011 |
| DE | 102009047788 | 3/2011 |
| DE | 102010014289 | 10/2011 |
| DE | 102016111600 | 12/2016 |
| DE | 102017112112 | 12/2018 |
| JP | S63168902 | 7/1998 |
| JP | 2004252469 | 9/2004 |
| JP | 2005215634 | 8/2005 |
| JP | 2008102199 | 5/2008 |
| JP | 2008545123 | 12/2008 |
| JP | 2011192494 | 9/2011 |
| JP | 2011257163 | 12/2011 |
| JP | 2020181027 | 11/2020 |
| KR | 10-2153824 | 9/2020 |
| WO | WO 03/087928 | 10/2003 |
| WO | WO 06/010790 | 2/2006 |
| WO | WO 15/197832 | 12/2015 |
| WO | WO 18/185218 | 10/2018 |
| WO | WO 21/005601 | 1/2021 |
| WO | WO 21/084919 | 5/2021 |

\* cited by examiner

220

| 222A | 222B | 222C | 222D | 222E | 222F | 222G | 222H |
|------|------|------|------|------|------|------|------|
| 224A | 224B | 224C | 224D | 224E | 224F | 224G | 224H |
| 226A | 226B | 226C | 226D | 226E | 226F | 226G | 226H |
| 228A | 228B | 228C | 228D | 228E | 228F | 228G | 228H |

| 232A | 232B | 232C | 232D | 232E | 232F | 232G | 232H |
|------|------|------|------|------|------|------|------|
| 234A | 234B | 234C | 234D | 234E | 234F | 234G | 234H |
| 236A | 236B | 236C | 236D | 236E | 236F | 236G | 236H |
| 238A | 238B | 238C | 238D | 238E | 238F | 238G | 238H |

IMAGE CAPTURE SYSTEMS UTILIZING ADJUSTABLE ILLUMINATION

FIELD

This disclosure relates generally to dynamically adjusting illumination provided by a camera flash module. More particularly, this disclosure relates to spatially adjusting an illumination profile based on a camera flash module based on target regions identified in a scene.

BACKGROUND

Cameras continue to be an important feature of consumer electronics devices such as smartphones, tablets, and computers. These cameras are used for a wide range of operations, such as capturing videos or still images. In low light conditions, a flash module may be used to illuminate a scene to facilitate image capture. Flash illumination during image capture may create artifacts in the captured image, such as red eye effects, flash reflections, or the like. It may be desirable to provide a flash module with the flexibility to reduce these artifacts.

SUMMARY

The present disclosure relates to cameras, devices, and systems for spatially adjusting illumination provided by a flash module. Some embodiments are directed to a device having a flash module that includes an emitter array comprising a plurality of light emitters, a lens assembly positioned to image the emitter array onto the field of illumination, and a flash controller configured to control the plurality of light emitters to generate light. The flash controller is configured to determine that a portion of a face of a user including an eye of the user is positioned within the field of illumination, select a first set of light emitters of the plurality of light emitters associated with a portion of the eye, and select a second set of light emitters of the plurality of light emitters associated with a region surrounding the portion of the eye. The flash controller is also configured to control the first set of light emitters to emit light at a first set of brightness levels, and control the second set of light emitters to emit light at a second set of brightness levels greater than the first set of brightness levels.

In some variations, the device further includes a camera. The camera can capture an image while the flash controller controls the first set of light emitters to emit light at the first set of brightness levels and control the second set of light emitters to emit light at the second set of brightness levels greater than the first set of brightness levels. Additionally or alternatively, the region surrounding the portion of the eye includes an additional portion of the eye. In some instances, the device includes a depth sensor. The flash controller determines a distance to the face using depth information obtained by the depth sensor, and the flash controller selects the first set of brightness levels based on the determined distance. In other instances, the flash module includes a diffractive element positioned to diffract light exiting the lens assembly. Additionally or alternatively, the flash module includes a microlens array positioned over the emitter array. The emitter array may include a display array.

Other embodiments are directed to a device having a flash module that includes an emitter array comprising a plurality of light emitters, a lens assembly positioned to image the emitter array onto the field of illumination, and a flash controller configured to control the plurality of light emitters to generate light. The flash controller is configured to determine that a reflected image of the device including the flash module is positioned within the field of illumination, select a first set of light emitters of the plurality of light emitters associated with a first portion of the reflected image that includes the flash module, and select a second set of light emitters of the plurality of light emitters associated with a region surrounding the first portion of the reflected image. The flash controller is also configured to control the first set of light emitters to emit light at a first set of brightness levels, and control the second set of light emitters to emit light at a second set of brightness levels greater than the first set of brightness levels.

In some of these variations, the device further includes a camera. The camera can capture an image while the flash controller controls the first set of light emitters to emit light at the first set of brightness levels and controls the second set of light emitters to emit light at the second set of brightness levels greater than the first set of brightness levels. Additionally or alternatively, the region surrounding the first portion of the reflected image includes a second portion of the reflected image. In some instances, the device includes a depth sensor. The flash controller determines a distance to the reflected image using depth information obtained by the depth sensor, and the flash controller selects the first set of brightness levels based on the determined distance. In other instances, the flash module includes a diffractive element positioned to diffract light exiting the lens assembly. Additionally or alternatively, the flash module includes a microlens array positioned over the emitter array. The emitter array may include a display array.

Yet other embodiments are directed to methods of illuminating a field of illumination using a flash module comprising a plurality of light emitters. The method includes detecting an object positioned within the field of illumination, identifying a first region of the field of illumination corresponding to a first portion of the detected object, identifying a second region of the field of illumination corresponding to a second portion of the detected object, and illuminating the field of illumination using the flash module. The flash module illuminates the first region at a first set of illumination levels and the second region at a second set of illumination levels, and the second set of illumination levels is greater than the first set of illumination levels.

In some of these variations, the method further includes capturing an image while illuminating the field of illumination using the flash module. In other variations, the method includes selecting an illumination profile, the illumination profile having a plurality of brightness levels such that each brightness level of the plurality of brightness levels is associated with a corresponding light emitter of the plurality of light emitters, and illuminating the field of illumination includes controlling each light emitter of the plurality of light emitters to generate light with a brightness level associated with the corresponding light emitter.

In some of these variations, the plurality of light emitters comprises a first set of light emitters associated with the first region and a second set of light emitters associated with the second region. Illuminating the field of illumination includes controlling the first set of light emitters to generate light at a first set of brightness levels, and controlling the second set of light emitters to generate light at a second set of brightness levels greater than the first set of brightness levels. In some of these variations, the first set of light emitters includes a first subset of light emitters and a second subset of light emitters and the first set of brightness levels includes a first brightness level and a second brightness level greater than the first brightness level. Controlling the first set of light emitters to generate light at a first set of brightness levels includes controlling the first subset of light emitters to generate light at the first brightness level and controlling the second subset of light emitters to generate light at the second brightness level. Additionally or alternatively, the first set of brightness levels is selected using a depth calculated between the object and the flash module.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which:

FIG. 2B shows an example field of illumination of the flash module of FIG. 2A. FIGS. 2C-2E show an example emitter array used to illuminate the field of illumination of FIG. 2B.

Figure 1A:
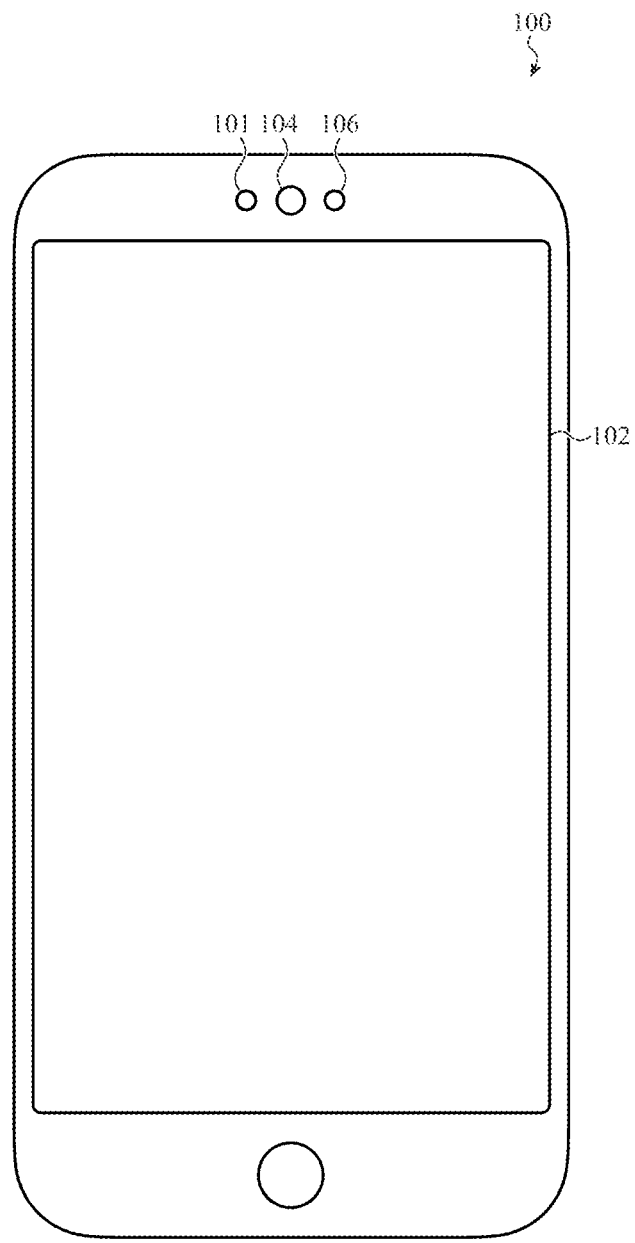
FIGS. 1A and 1B show front and rear views, respectively, of an example of an electronic device having a camera with a spatially adjustable flash module.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

Directional terminology, such as "top", "bottom", "upper", "lower", "front", "back", "over", "under", "above", "below", "left", "right", "vertical", "horizontal", etc. is used with reference to the orientation of some of the components in some of the figures described below, and is not intended to be limiting. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to devices, systems, and methods for spatially controlling illumination provided by a flash module. The flash module includes a flash controller that controls light emitters of an emitter array according to an illumination profile. The illumination profile is selected to reduce a relative brightness to a target region of the flash module's field of illumination. The target region is associated with a portion of a target object identified in the field of illumination. In some instances, the target region corresponds to a portion of a user's eye that is positioned within the field of illumination. In other instances, the flash module is incorporated into a device, and the target region corresponds to a reflected image of a portion of the device that is positioned within the field of illumination. These and other embodiments are discussed below with reference to FIGS. 1A-6B. However, those skilled in the art will readily appreciate that the detailed description given herein with respect to these Figures is for explanatory purposes only and should not be construed as limiting.

Figure 1B:
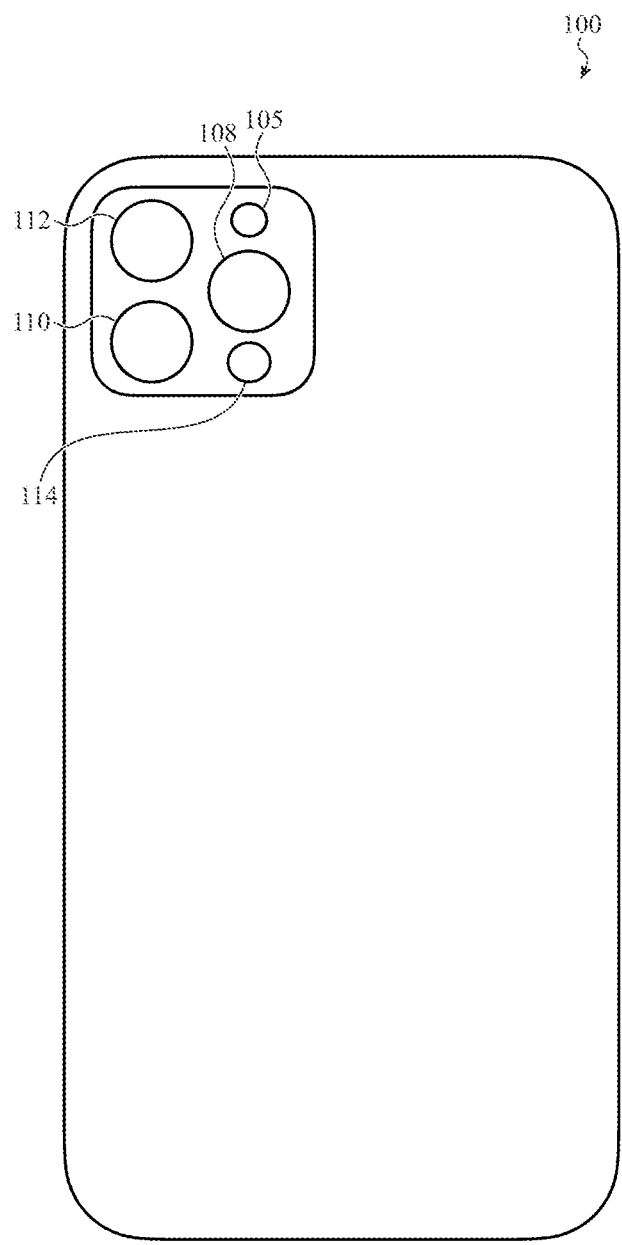
Figure 1C:
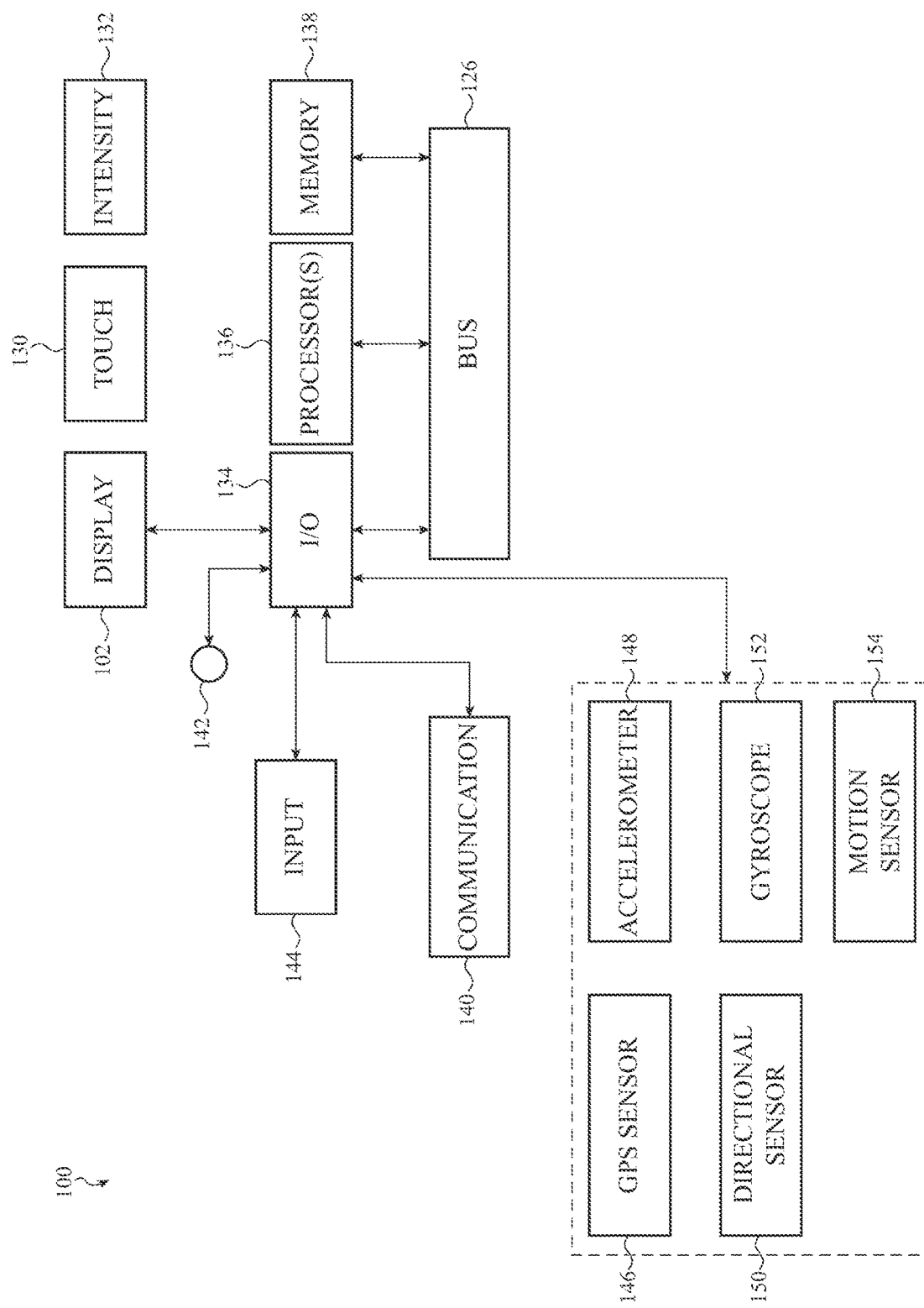
FIG. 1C depicts exemplary components of the device of FIGS. 1A and 1B.

The devices, systems, and methods described here include an electronic device having at least one spatially adjustable flash module. FIGS. 1A-1C depict an example device 100 as described herein. FIG. 1A shows a front view of the device 100, which includes a display 102, a front-facing flash module 101, and a front-facing camera 104. The display 102 may provide a graphical output that is viewable through or at a front exterior surface of the device 100. The front-facing camera 104 is positioned to view a portion of the environment in front of the display 102 (i.e., the "field of view", which is the spatial extent of a scene that a camera is able to capture using an image sensor of the camera). Similarly, the front-facing flash module 101 may illuminate a portion of the environment in front of the display 102 (i.e., the "field of illumination" of the front-facing flash module 101. The field of illumination of the front-facing flash module 101 at least partially overlaps the field of view of the front-facing camera 104, which allows the front-facing flash module 101 to illuminate the camera's field of view during image capture.

In some instances, the device 100 may further include a front-facing depth sensor 106 that may calculate depth information for a portion of the environment in front of the device 100. Specifically, the front-facing depth sensor 106 may calculate depth information within a field of coverage (i.e., the widest lateral extent to which the depth sensor is capable of providing depth information). The field of coverage of the front-facing depth sensor 106 may at least partially overlap the field of illumination of the front-facing flash module 101, thereby allowing the front-facing depth sensor 106 to calculate depth information associated with the field of illumination of the front-facing flash module 101. The front-facing depth sensor 106 may be any suitable system that is capable of calculating the distance between the front-facing depth sensor 106 and various points in the environment around the device 100. The depth sensor may generate a depth map including these calculated distances, some or all of which may be used in the various techniques described below.

The depth information may be calculated in any suitable manner. In one non-limiting example, a depth sensor may utilize stereo imaging, in which two images are taken from different positions, and the distance (disparity) between corresponding pixels in the two images may be used to calculate depth information. In another example, a depth sensor may utilize structured light imaging, whereby the depth sensor may image a scene while projecting a known pattern (typically using infrared illumination) toward the scene, and then may look at how the pattern is distorted by the scene to calculate depth information. In still another example, a depth sensor may utilize time of flight sensing, which calculates depth based on the amount of time it takes for light (typically infrared) emitted from the depth sensor to return from the scene. A time-of-flight depth sensor may utilize direct time of flight or indirect time of flight, and may illuminate an entire field of coverage at one time, or may only illuminate a subset of the field of coverage at a given time (e.g., via one or more spots, stripes, or other patterns that may either be fixed or may be scanned across the field of coverage). In instances where a depth sensor utilizes infrared illumination, this infrared illumination may be utilized in a range of ambient conditions without being perceived by a user.

FIG. 1B shows a rear view of the device 100, which includes a set of rear facing cameras and a rear-facing flash module 105. In the variation shown in FIG. 1B, the set of rear facing cameras includes a first rear-facing camera 108, a second rear-facing camera 110, and a third rear-facing camera 112. The rear-facing cameras may have fields of view that at least partially overlap with each other, which may allow the rear-facing cameras to capture different aspects of a scene facing a rear surface of the device 100. For example, in some instances each rear-facing camera has a different focal length, and thereby has a field of view with a different size. The choice of the size of a camera's field of view may impact the situations in which a particular camera may be useful. For example, cameras with longer focal lengths (and narrower fields of view) are often used in telephoto imaging where it is desirable to increase the magnification of a subject at farther distances, while cameras with shorter focal lengths (and wider fields of view) are often used in instances where it is desirable to capture more of a scene (e.g., landscape photography).

The field of illumination of the rear-facing flash module 105 at least partially overlaps the fields of view for some or all of the rear-facing cameras (e.g., any or all of the first rear-facing camera 108, the second rear-facing camera 110, and the third rear-facing camera 112). To the extent that the field of illumination of the rear-facing flash module 105 overlaps with a corresponding field of view of one of these cameras, the rear-facing flash module 105 may illuminate that camera's field of view during image capture.

Also shown there is a rear-facing depth sensor 114, which may be configured in any manner as discussed previously with respect to the front-facing depth sensor 106. A field of coverage of the rear-facing depth sensor 114 may at least partially overlap the field of illumination of the rear-facing flash module 105, thereby allowing the rear-facing depth sensor 114 to calculate depth information associated with the field of illumination of the rear-facing flash module 105. The field of coverage of the rear-facing depth sensor 114 may also overlap the fields of view for some or all of the rear-facing cameras discussed above.

While the device 100 is shown in FIGS. 1A and 1B as having two flash modules, four cameras, and two depth sensors, it should be appreciated that the device 100 may have any number of cameras and depth sensors as desired. The principles described herein may be applied to any flash module (or modules), camera (or cameras), and depth sensor (or depth sensors) of the device 100. For the purpose of illustration, the principles of operation described herein are described with respect to a single camera associated with a single flash module, which may represent any flash module of that device (e.g., a front-facing flash module, a rear-facing flash module, or the like).

In some embodiments, the device 100 is a portable multifunction electronic device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer, which may have a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system (e.g., display 102). In some embodiments, the display generation component is separate from the computer system. As used herein, "displaying" content includes causing to display the content by transmitting, via a wired or wireless connection, data (e.g., image data or video data) to an integrated or external display generation component to visually produce the content.

FIG. 1C depicts exemplary components of device 100. In some embodiments, device 100 has a bus 126 that operatively couples I/O section 134 with one or more computer processors 136 and memory 138. I/O section 134 can be connected to display 102, which can have touch-sensitive component 130 and, optionally, intensity sensor 132 (e.g., contact intensity sensor). In addition, I/O section 134 can be connected with communication unit 140 for receiving application and operating system data, using Wi-Fi, Bluetooth, near field communication (NFC), cellular, and/or other wireless communication techniques. Device 100 can include input mechanisms 142 and/or 144. Input mechanism 142 is, optionally, a rotatable input device or a depressible and rotatable input device, for example. Input mechanism 142 is, optionally, a button, in some examples. Device 100 optionally includes various sensors, such as GPS sensor 146, accelerometer 148, directional sensor 150 (e.g., compass), gyroscope 152, motion sensor 154, and/or a combination thereof, all of which can be operatively connected to I/O section 134. Some of these sensors, such as accelerometer 148 and gyroscope 152 may assist in determining an orientation of the device 100 or a portion thereof.

Memory 138 of device 100 can include one or more non-transitory computer-readable storage mediums, for storing computer-executable instructions, which, when executed by one or more computer processors 136, for example, can cause the computer processors to perform the techniques that are described here (methods performed by the flash controllers described below). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

The processor 136 can include, for example, dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute an operating system and applications of device 100, as well as to facilitate setting a field of view of a camera and capturing of images as described herein. Device 100 is not limited to the components and configuration of FIG. 1C, but can include other or additional components in multiple configurations.

Figure 2A:
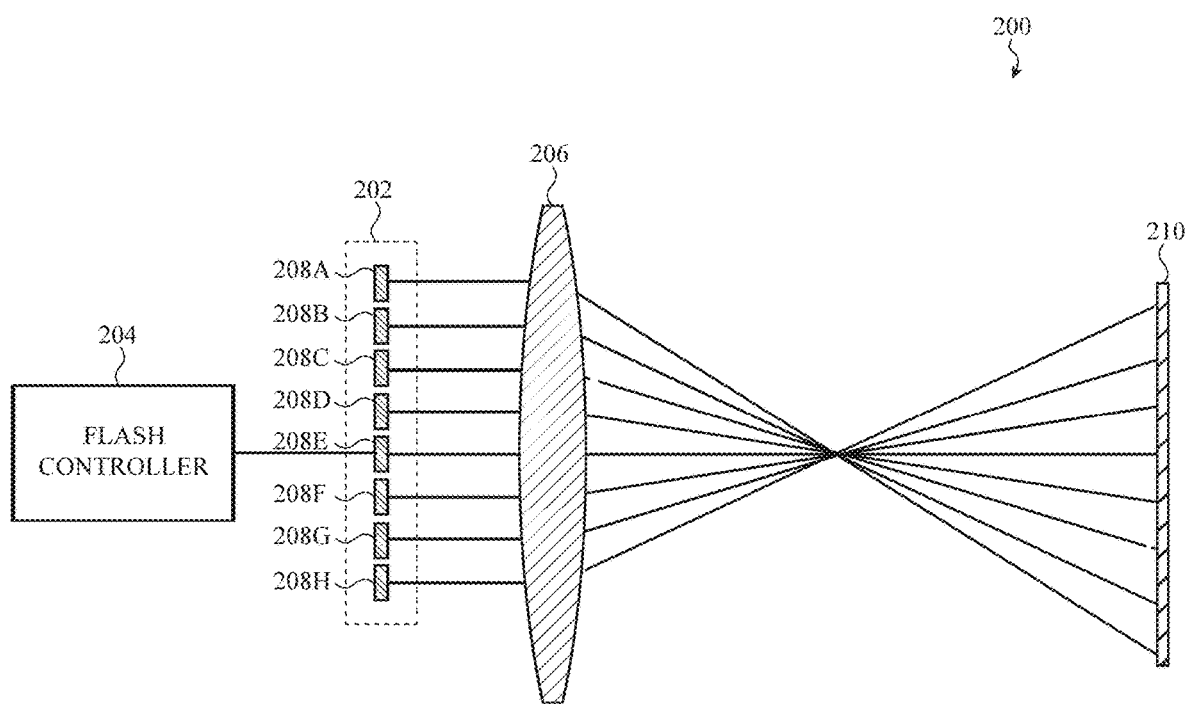
FIG. 2A shows a side view of components of a flash module as described herein.

At least one flash module of device 100 is capable of spatially varying the illumination provided by the flash module, which allows the flash module to provide a different intensity of illumination to different portions of that flash module's field of illumination. FIG. 2A shows a side view of a portion of a spatially adjustable flash module 200 that may be used with the devices described herein. As shown there, the flash module 200 includes an emitter array 202, a flash controller 204, and a lens assembly 206. The emitter array 202 includes a plurality of light emitters 208A-208H. While eight light emitters 208A-208H are shown in FIG. 2A, it should be appreciated that the emitter array 202 may include any number of light emitters arranged in any suitable manner (e.g., a 1×N array, an N×N array, an N×M array, non-rectangular arrays, or the like). It should be appreciated that, in some instances, the emitters of a given emitter array may be arbitrarily arranged such that they are not arranged in any particular pattern.

Each light emitter of the emitter array 202 is individually controllable to emit light and illuminate a corresponding portion of the field of illumination of the flash module 200. Each light emitter of the plurality of light emitters 208A-208H includes one or more light-emitting elements, such as a light emitting diode (LED) or the like, that illuminate a common region of the field of illumination. In some instances, the emitter array 202 includes a light-emitting display array such as a micro-LED (µLED) display array, a liquid crystal display (LCD) array, an organic-LED (oLED) display, a quantum dot LED (qLED) display array, or the like. In these instances, each light emitter of the plurality of light emitters 208A-208H may include a set of display pixels. The set of display pixels may include a single pixel or may include a plurality of display pixels that are controlled together. In these variations, using a display array as the emitter array 202 may provide for high spatial resolution in controlling the illumination provided by the flash module 200.

The lens assembly 206 is positioned to receive light emitted by each of the plurality of light emitters 208A-208H of the emitter array 202 and image that light onto the field of illumination of the flash module 200. The lens assembly 206, while depicted in FIG. 2B as a single lens element, includes one or more lens elements that are collectively configured to image light from the emitter array 202 onto the field of illumination. In some instances, the lens assembly 206 may be configured to image the emitter array 202 onto a plane 210 in a scene that is a target distance from the flash module 200, which may act to minimize the overlap of illumination between adjacent light emitters at the target distance. In some instances, the lens assembly 206 is moveable relative to emitter array 202 to dynamically adjust the target distance at which the emitter array 202 is imaged. The target distance may be adjusted based on an analysis of the scene, such as using a distance to a person or object identified in the scene.

Each of the plurality of light emitters 208A-208H may be individually addressed to control the illumination provided to a corresponding region of the field of illumination of the flash module. Specifically, each light emitter may be controlled to set the intensity of illumination provided by that light emitter. In some instances, the light emitter may be further controlled to set the color of illumination provided by the light emitter. For example, a display pixel of a display array as discussed above may include multiple sub-pixels, each capable of generating a different color of light (e.g., a red sub-pixel, a green sub-pixel, and a blue sub-pixel). The individual sub-pixels may be individually controlled to select the color emitted by the display pixel.

Figures 2D, 2E:
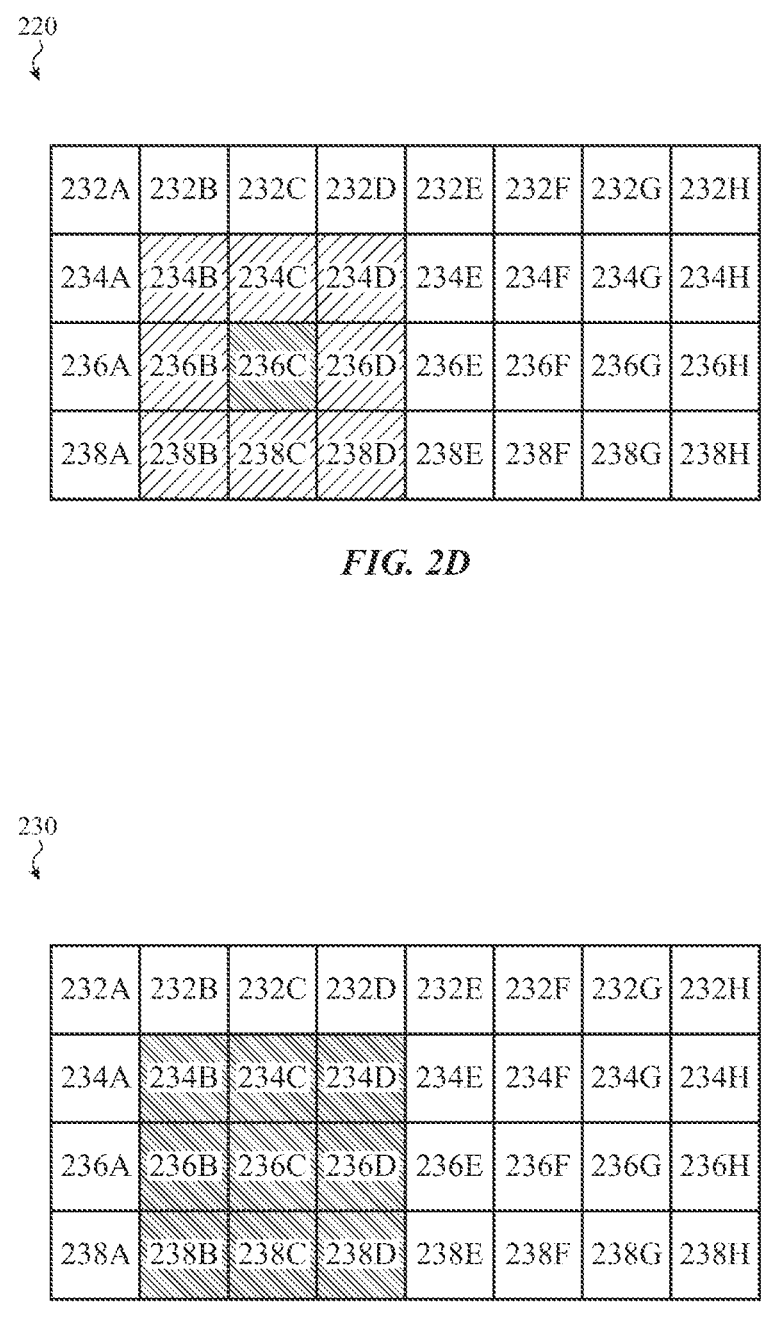

FIG. 2B shows an example field of illumination 220 of the flash module 200. As shown there, the field of illumination is divided into a plurality of regions, where each region is illuminated by a different light emitter of the emitter array 202. For the sake of illustration, the field of illumination 220 is divided into a 4×8 array, including a first row with eight regions 222A-222H, a second row with eight regions 224A-224H, a third row with eight regions 226A-226H, and a fourth row with eight regions 228A-228H. FIGS. 2C-2D show front views of an example of a variation of an emitter array 230 that may be used to illuminate the field of illumination 220 of FIG. 2B. In these instances, emitter array 230 includes 32 light emitters arranged in a 4×8 array, including a first row of light emitters 232A-232H, a second row of light emitters 234A-234H, a third row of light emitters 236A-236H, and a fourth row of light emitters 238A-238H. In this example, each light emitter illuminates a different corresponding region of the field of illumination 220. For the sake of illustration, the first row of emitters 232A-232H illuminate the first row of regions 222A-222H, the second row of emitters 234A-234H illuminates the second row of regions 224A-224H, and so forth, though it should be appreciated that the lens may actually invert the image of the emitter array 230 onto the field of illumination 220 such that emitter 232A corresponds to region 228H and so forth.

As will be described in more detail below, it may be desirable to reduce the illumination provided to a subset of the field of illumination 220. For example, a first region of the field of illumination (i.e., a region associated with a portion of an object of interest) may receive less illumination than a second region of the field of view surrounding the first region. To accomplish this the flash controller 204 may select an illumination profile having a plurality of brightness values, where each brightness value is associated with one of the plurality of light emitters of the emitter array (e.g., emitter array 202 or emitter array 220). The flash module 200 may utilize this illumination profile when providing illumination, such that the flash controller 204 controls each light emitter of the emitter array to generate light at its corresponding brightness level. As a result, each region of the field of illumination 220 is illuminated at a corresponding illumination level from the flash array 200, where the illumination level for a given region is dependent on the brightness level of the light emitter associated with the region.

In instances where the light emitters can be controlled to vary the color of the light emitted thereby, the illumination profile may also include a plurality of color values, where each color value is associated with a corresponding light emitter. Each color value represents a color to be generated by the light emitter. Accordingly, when the flash module 200 utilizes the illumination profile as discussed above, it may further control each light emitter of the emitter array to generate light at its corresponding color value.

The flash controller 204 may control a first set of light emitters to generate light at a first set of brightness levels, and may control a second set of light emitters to generate light at a second set of brightness levels greater than the first set of brightness levels. Optionally, the flash controller 204 may control the first set of light emitters to emit light at a first set of color values, and may control the second set of light emitters to generate light at a second set of color values. FIG. 2C shows an instance of emitter array 230 in which the first set of light emitters includes a single light emitter (light emitter 236C), while the second set of light emitters includes the remaining light emitters of the emitter array 230 depicted in FIG. 2C. In this instance, the light emitter 236C may be controlled to generate light at a first brightness level (as indicated by hashing), while the remaining light emitters are controlled to generate light at a second set of brightness levels, each of which is greater than the first brightness level. The second set of brightness levels may all have the same brightness, or different light emitters within the second set of light emitters may emit light at different brightness levels.

In some of these instances, some or all of the first set of light emitters are controlled so that they are not actively generating light. For the purpose of this application, a light emitter that is not actively generating light during illumination by the flash module 200 is considered to be controlled to generate light with a brightness level of zero. In other words, the illumination profile may include brightness levels of zero for some or all light emitters in the first set of light emitters, and these light emitters will not actively generate light when the flash controller 204 is controlling the first set of light emitters to generate light at the first set of brightness levels.

The first set of light emitters may include multiple light emitters. For example, in FIG. 2D, the first set of light emitters includes nine light emitters (light emitters 234B-234D, 236B-236D, and 238B-238D) that are controlled to generate light at reduced brightness levels relative to the remaining light emitters. In these instances, the first set of light emitters includes a first subset of light emitters (light emitter 236C), each of which is controlled to generate light at a first brightness level, and a second subset of light emitters (light emitters 234B-234D, 236B, 236D, and 238B-238D), each of which is controlled to generate light at a second brightness level greater than the first. In this way, each of the first subset of light emitters generates light at a brightness level less than that of each of the second subset of light emitters, which in turn is less than the brightness level of each of the second set of light emitters.

The first set of light emitters may include any number of subsets of light emitters controlled to generate light at a corresponding brightness level (which collectively form the first set of brightness levels), and each of these subsets of light emitters may include any number of light emitters as may be desired In some instances, such as shown in FIG. 2E, all of the light emitters of the first set of light emitters (i.e., light emitters 234B-234D, 236B-236D, and 238B-238D) are controlled to generate light at the same brightness levels. In instances where the first set of light emitters includes multiple subsets of light emitters controlled to generate light at multiple different brightness levels, the first set of light emitters may provide varying brightness, such as a brightness gradient, across the corresponding first region of the field of illumination 220.

Specifically, a first emitter corresponding to region 226C is controlled to generate light at a first brightness level as discussed above. The eight emitters corresponding to the regions surrounding region 226C (i.e., 224B-224D, 226B, 226D, and 228B-228D) are controlled to generate light at a second brightness level, while the remaining light emitters in the emitter array 202 are controlled to generate light at a third brightness level. The third brightness level is greater than the second brightness level, which in turn is greater than the first brightness level. As a result, the region 226C relieves less illumination that regions 224C-224D, 226B, 226D, and 228B-228D, and each of these regions 224B-224D, 226B, 226D, and 228B-228D receive less illumination than the remaining regions of the field of illumination. In this way, multiple groups different brightness levels may be utilized to provide illumination with a brightness gradient to a target region.

Figure 3A:
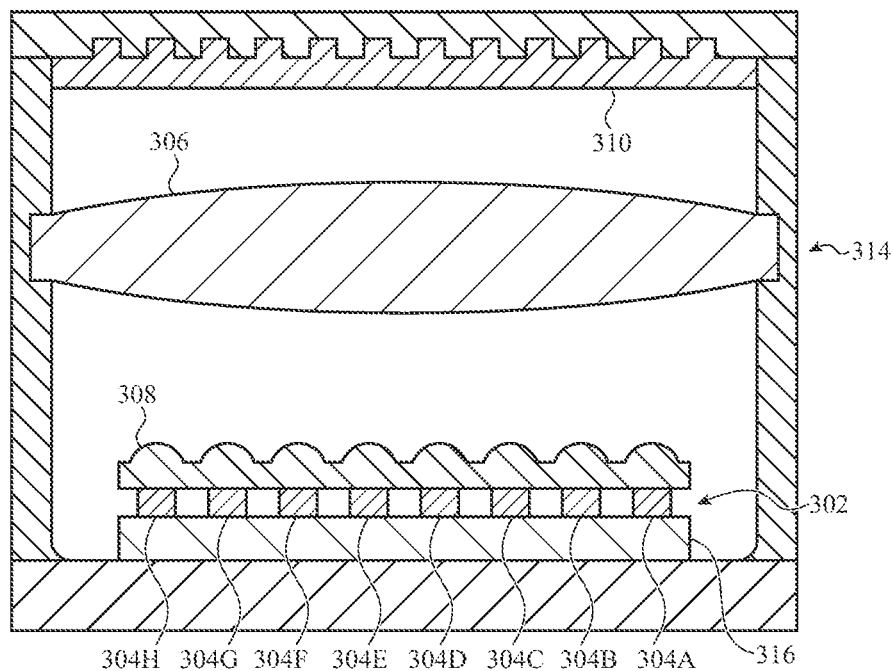
FIG. 3A shows a cross-sectional side view of an illustrative example of a flash module that may be used with the devices described herein.

FIG. 3A shows another example of a flash module 300 that may be used with the systems, devices, and methods described herein. The flash module 300 may include an emitter array 302 including a plurality of light emitters 304A-304H, a lens assembly 306, and a flash controller (not shown), such as described in more detail above. The flash module 300 may include a housing 314, which may enclose some or all of the components of the flash module 300, including the emitter array 302 and the lens assembly 306. In some instances the flash module 300 includes control circuitry 316, which may selectively power the plurality of light emitters 304A-304H to generate light as described herein, and that is enclosed in the housing 314.

Additionally or alternatively, some variations of the flash module 300 described herein include a microlens array 308. In these instances, the microlens array 308 is positioned over the emitter array 302, such that at least one microlens is positioned over each light emitter of the plurality of light emitters 304A-304H. The microlenses of the microlens array can help to align light emitted by the emitter array 302, which may assist in imaging the emitter array 302 onto the field of view.

Figure 3B:
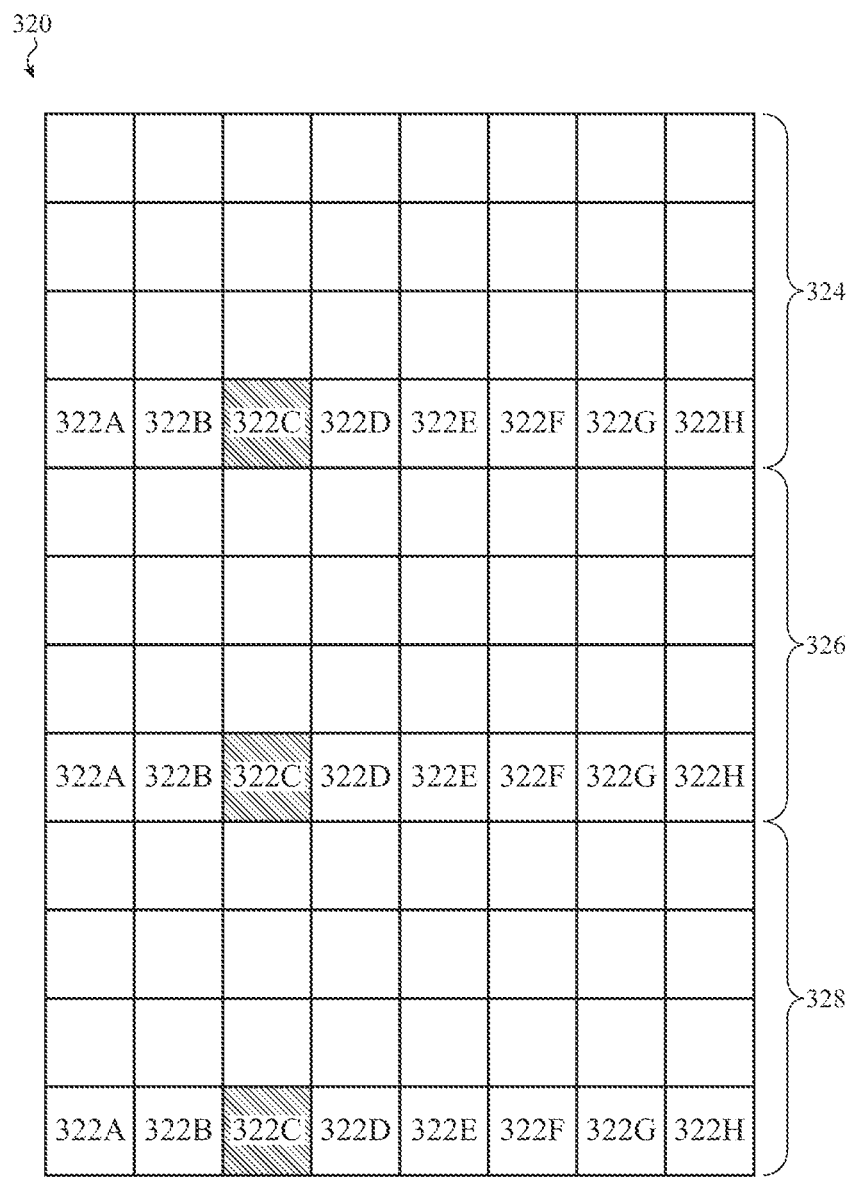
FIG. 3B shows an example field of view of the flash module of FIG. 3A.

Additionally or alternatively, the flash module 300 includes a diffractive element 310 configured to replicate an image of the emitter array 302 projected onto the field of illumination. For example, the lens assembly 306 may be positioned between the emitter array 302 and the diffractive element 310, such that the diffractive element 310 diffracts the light exiting the lens assembly 306. In this way, the diffractive element 310 splits each region of light exiting the lens assembly 306 into a plurality of different regions of the field of illumination. For example, FIG. 3B shows an example field of illumination 320 of the flash module 300. In this variation, the diffractive element 310 splits an image of the emitter array 302 projected by the lens assembly 306 into three different projections, including a first projection 324, a second projection 326, and a third projection 328.

Each of the first, second, and third projections 324, 326, and 328 receives the same illumination from the flash module. For example, in the variation shown in FIG. 3B, each projection is divided into a 4×8 array of regions (including a first row of regions 322A-322H) corresponding to (and illuminated by) a 4×8 array of light emitters of the emitter array 302. Accordingly, each light emitter of the emitter array 302 illuminates a corresponding region in each of the first, second, and third projections 324, 326, and 328. This may allow the flash module to illuminate a wider range of a scene while maintaining a size of the emitter array 302.

The brightness level of a given light emitter may be reduced to reduce the illumination level provided to a region of the field of view (e.g., the region 322C in the first projection 324), but this also results in a reduced illumination level of the same region in the second and third projections 326, 328. This may result in reduced illumination relative to what is desired for region 322C in the second and third projections 326, 328. When the flash module 300 is provided illumination during image capture by a camera, the captured image may be corrected to account for the reduction in brightness in the other projections.

Figure 4:
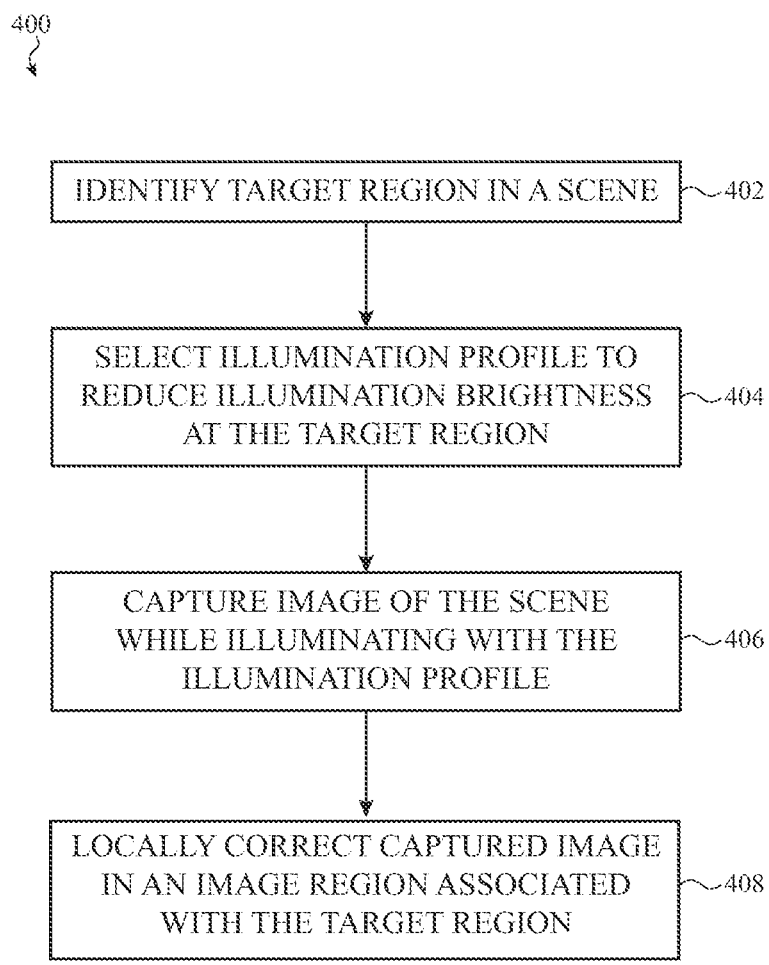
FIG. 4 depicts a method of illuminating a field of view of the flash modules described herein.

The flash modules described herein may be used for a number of purposes. For example, the flash module may be used to project text or images onto a surface (e.g., a wall, desk, or the like). In other instances, the flash module of a device may provide illumination to a portion of a camera's field of view during image capture to provide additional light to the field of view. For example, FIG. 4 depicts a method 400 of using a flash module to illuminate a field of illumination. At step 402, the method includes determining a target region of the field of illumination.

The target region may be identified in any suitable manner. For example, in some instances this includes detecting a target object within a scene, where the target region corresponds to a portion of the object. The target object may be detected in any suitable manner. For example, one or more images may be captured by one or more cameras of the device, and the one or more images may be analyzed (e.g., using known object detection techniques) to determine the presence and/or location of the target object. In some of these variations, an infrared camera (which may be part of a depth sensor as discussed in more detail above) may capture the one or more images. This may be beneficial in low-light situations, as the device may provide infrared illumination to facilitate capturing one or more images with the infrared camera without being perceived by a user. Additionally or alternatively, depth information from one or more depth sensors of the device may be analyzed to determine the presence and/or location of the target object.

At step 404, the method selects an illumination profile for an emitter array that reduces illumination at the target region compared to surrounding regions of the field of illumination. The illumination profile includes a corresponding brightness level for each light emitter of the emitter array as described in more detail above. As part of selecting an illumination profile, the method may further select a second region of the field of illumination. In some instances, the second region of the field of illumination surrounds the target region. Additionally or alternatively, the second region corresponds to a second portion of the target object. In some instances, the second region may be the remaining portion of the field of illumination that is not the target region.

The illumination profile is selected such that the flash module provides illumination to the target region at a first set of illumination levels and provides illumination levels to the second region at a second set of illumination levels that is greater than the first set of illumination levels. In other words, each portion of the target region receives illumination at a corresponding illumination level that is less than the illumination levels received by the portions of the second region.

The flash module may then illuminate the field of illumination according to the illumination profile. The illumination profile is selected such that a first set of emitters corresponding to the target region is controlled (e.g., by a flash controller described above) to generate light at a first set of brightness levels, and a second set of emitters corresponding to the second region is controlled to generate light at a second set of brightness levels greater than the first set of brightness levels. In some instances, the first set of emitters includes multiple subsets of emitters, such that each subset of emitters is controlled to generate light at a different brightness level selected from the first set of brightness levels. For example, the first set of emitters may include a first subset of light emitters and a second subset of light emitters, and the first set of brightness levels may include a first brightness level and a second brightness level greater than the first brightness level. In these instances, the first subset of light emitters may be controlled to generate light at the first brightness level and the second subset of light emitters may be controlled to generate light at the second brightness level. In this way, different subregions of the target region may be illuminated at different illumination levels.

It should be appreciated that the size of the target region, the division of the first set of light emitters into one or more subsets, and/or the selection of the value or values of the first set of brightness levels may be dependent on a distance between the flash module and the target object. For example, in instances where the target object is the eye of a user (or a portion of thereof), the eye of the user may not be selected as a target region until the user's face is within a first threshold distance of the flash module. In these instances, when a user is positioned beyond the first threshold distance, the overall amount of illumination received by the user's eye may be sufficiently low as to not require reduced illumination. As a user gets closer than the first threshold distance, the number of light emitters in the first set of light emitters may increase as the distance decreases. Similarly, the brightness levels for some or all of the light emitters may decrease as the distance decreases. The distance between a target object and the flash module may be determined using a depth sensor and/or analyzing images captured by one or more cameras of the devices described above.

In some of these instances, the flash module may illuminate the field of illumination during image capture by one or more cameras of the device. Accordingly, at step 406, an image of the scene is captured (e.g., by one of the cameras of the device) while the flash module is illuminating the field of view using the illumination profile. The illumination may help expose the field of illumination, thereby providing a higher quality image as compared to a similar image captured without additional illumination, while still limiting the amount of illumination that is provided to the target region.

In some instances, the method may further include locally correcting the captured image in one or more image regions associated with the target region at step 408. For example, this may include correcting a brightness level associated with the image region(s). An image region may be a portion of the image that corresponds to a target region (i.e., the pixels that imaged the target region). In instances where a diffractive element creates multiple projections of an emitter array, and a portion of the target region is in a first projection, the image regions may include portions of other projections that received reduced illumination by virtue of providing reduced brightness to the target region in the first projection.

Figure 5A:
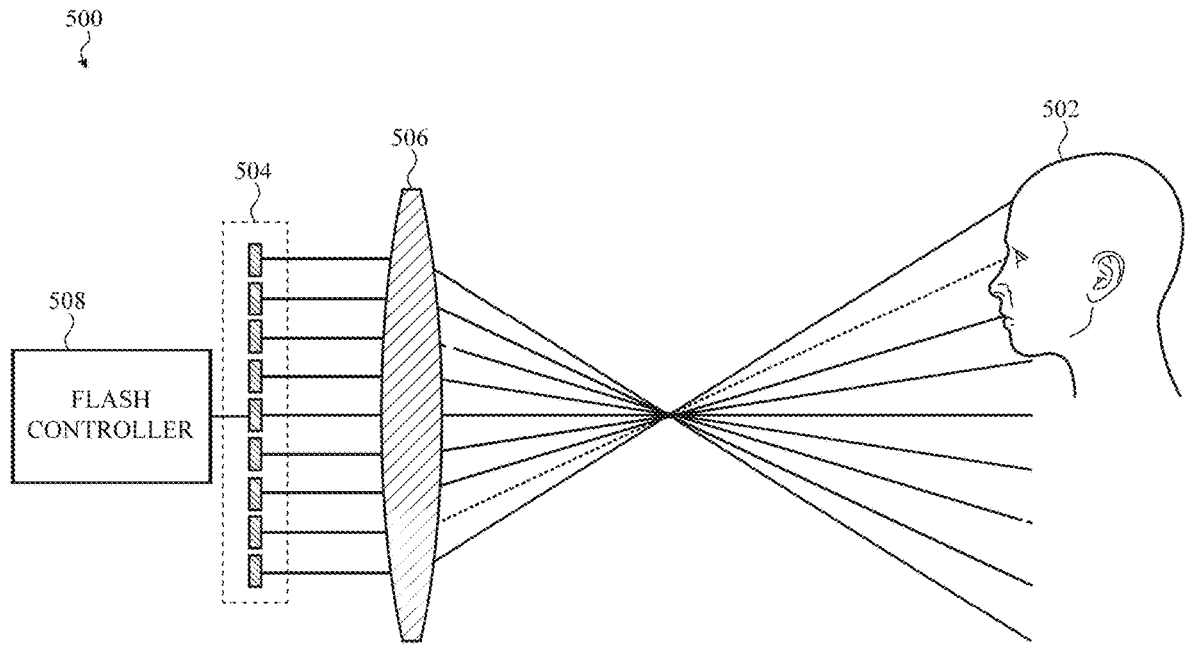
FIG. 5A shows a flash module positioned to illuminate a person using a spatially adjustable illumination pattern.

As mentioned above, the systems, devices, and methods described here may be used to reduce illumination provided to a user's eyes when the user is illuminated by the flash module. Shining a light into a user's eyes may bother other users and/or create artifacts such as red eye effects in captured images, and reducing the illumination provided to the eyes may mitigate these effects. FIG. 5A shows a side view of a portion of a flash module 500 that is used to illuminate the face 502 of a user positioned in a field of illumination of the flash module 500. The flash module 500 includes an emitter array 504 having a plurality of light emitters, a lens assembly 506, and a flash controller 508, which may be configured in any suitable manner as described above.

Figure 5B:
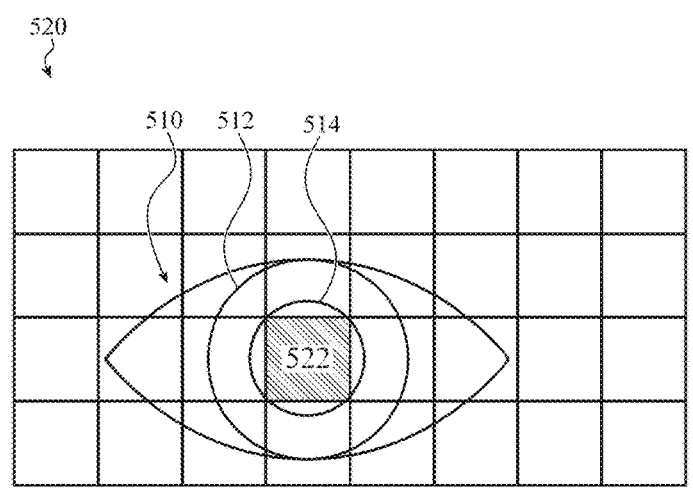
FIG. 5B shows a portion of the field of illumination of the flash module of FIG. 5A.

In these instances, the flash controller 508 may determine that a portion of the face 502 including a user's eye is positioned within the field of illumination of the flash module 500. For example, FIG. 5B shows a portion 520 of the field of illumination of the flash module 500, that includes a user's eye 510, including a user's iris 512 and pupil 514. The presence and location of the user's face 502 and eye 510 (or eyes) may be determined using any suitable object detection techniques applied to images and/or depth information captured by the cameras and/or depth sensors described herein. In instances where a depth sensor (or an infrared camera thereof) is used to detect the presence and location of the user's face 502 and eye 510, the device may provide infrared illumination to facilitate capturing one or more images with the infrared camera without being perceived by a user.

When the flash controller 508 determines that a user's eye 510 is positioned within the field of illumination of the flash module 500, the flash controller selects a first set of light emitters of the emitter array associated with a portion of the eye 510 (i.e., the emitters that will illuminate this portion of the eye when the flash module 500 illuminated the field of illumination). The flash module further selects a second set of light emitters associated with a portion of the user's face. In some instances, the second set of light emitters are associated with a portion of the user's face surrounding the portion of the eye. The flash controller 508 controls the first set of light emitters to emit light at a first set of brightness levels, and control the second set of light emitters to emit light at a second set of brightness levels greater than the first set of brightness levels. In this way, the selected portion of the eye 510 will receive less illumination that surrounding regions of the eye 510.

In these instances, the user's face may be the target object and the portion of the eye 510 may be the target region described above with respect to the method 400 of FIG. 4, and the method 400 may be used to illuminate the user's face 502 and eye 510. In some instances, the target region includes the user's entire eye, while the second region includes a portion of the user's face surrounding the eye (e.g., including portions of the eyelids, cheeks, forehead, combinations thereof, or the like). In other instances, the target region includes a first portion of the user's eye 510 (e.g., the pupil 514), while the second region includes a second portion of the user's eye (e.g., the iris 512 and sclera). For example, in the example shown in FIG. 5B, the first set of light emitters includes a single light emitter corresponding to region 522, and is controlled to generate light at a brightness level less than the brightness levels of the surrounding light emitters. In this example, the pupil 514 of the eye is the target region, and receives less illumination that the surrounding regions of the eye (including the iris 512).

In other variations, the target object in the method 400 is a reflected image of the device that incorporates the flash module (e.g., a reflection of the device in a mirror, glass, or other reflective surface in the scene). When a flash module illuminates a reflective surface, that illumination may be reflected by the surface and returned to the device. When a camera is capturing images during this illumination, this reflected light may saturate portions of the image and thereby create a flash reflection artifact. By reducing the illumination provided to a portion of the field of view associated with a reflected image of the device, this may reduce the presence of flash reflection artifacts in images captured during this illumination.

Figure 6A:
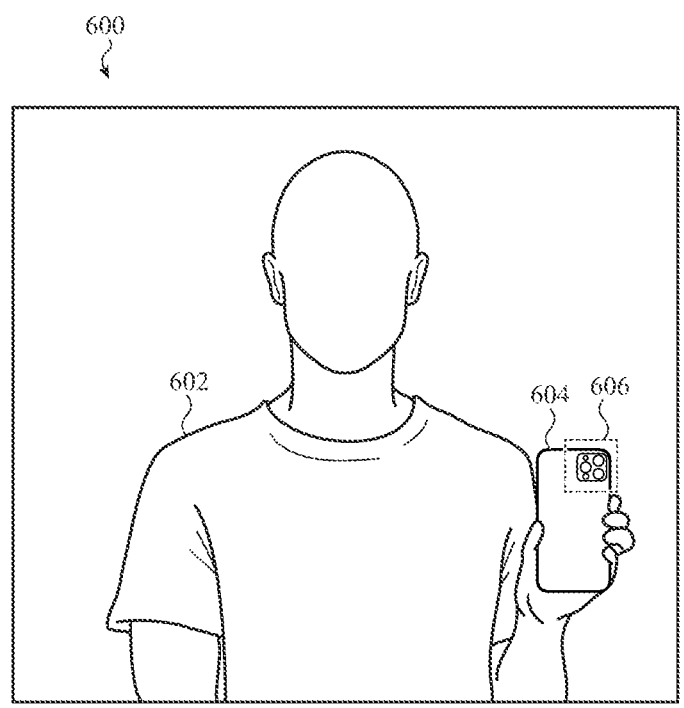
FIGS. 6A and 6B shows portions of a field of illumination of a flash module as described herein.
Figure 6B:
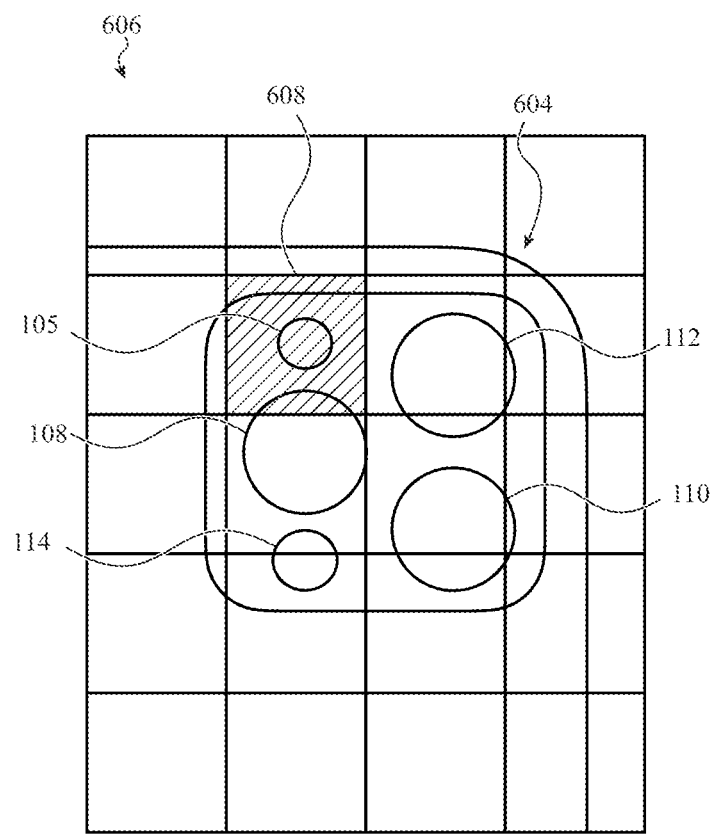

FIG. 6A shows a field of illumination 600 that includes a reflected image of a user 602 holding a device 604, and FIG. 6B shows a subset 606 of field of illumination 600. The reflected image of the device 604 may occur by virtue of the device 604 being positioned in front of a mirror or other reflective surface. In this example, device 604 is configured the same as device 100 of FIGS. 1A-1C, and includes a rear-facing flash module 105, a first rear-facing camera 108, a second rear-facing camera 110, a third rear-facing camera 112, and a rear-facing depth sensor 114.

A flash controller of a flash module (e.g., rear-facing flash module 105) may determine that a reflected image of a portion of the device 604 that includes the flash module is present in the field of illumination. The presence and location of this reflected image may be determined using any suitable object detection techniques applied to images and/or depth information captured by the cameras and/or depth sensors described herein. In some instances, one or more images may be captured during a pre-flash mode (during which the flash module illuminates the field of view), and the presence of flash reflection artifacts in the artifact may be used to help determine the presence and/or position of the reflected image.

The flash controller selects a first set of light emitters of the emitter array associated with a first portion of the reflected image of the device 604 that corresponds to the flash module (e.g., region 608 in FIG. 6B). The flash module further selects a second set of light emitters associated with a surrounding region of the field of illumination. In some instances, some of the second set of light emitters are positioned to illuminate a second portion of the reflected image of the device 604. The flash controller controls the first set of light to emit light at a first set of brightness levels, and controls the second set of light emitters to emit light at a second set of brightness levels greater than the first set of brightness levels. In this way, the selected portion of the reflected image of the device 604 will receive less illumination than the surrounding regions of the field of illumination.

In these instances, the reflected image of a portion of the device 604 may be the target object and the portion of the reflected image corresponding to the flash module may be the target region described above with respect to the method 400 of FIG. 4, and the method 400 may be used to illuminate the reflected image of the portion of the device 604. For example, an image may be captured at step 406 that includes the reflected image of the device 604.

It should be appreciated that the flash controllers may determine that multiple target regions are present in the field of illumination (e.g., both eyes of a user, multiple reflected images of the device, combinations thereof, or the like). In these instances, the flash controller may select an illumination profile that has multiple target regions, each of which receives less illumination than surrounding regions as discussed above.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A device for illuminating a field of illumination, the device comprising:
   a flash module comprising:
      an emitter array comprising a plurality of light emitters;
      a lens assembly positioned to image the emitter array onto the field of illumination; and
      a flash controller configured to control the plurality of light emitters to generate light, wherein the flash controller is configured to:
         determine that a portion of a face of a user including an eye of the user is positioned within the field of illumination;
         select a first set of light emitters of the plurality of light emitters associated with a portion of the eye;
         select a second set of light emitters of the plurality of light emitters associated with a region surrounding the portion of the eye;
         control the first set of light emitters to emit light at a first set of brightness levels; and
         control the second set of light emitters to emit light at a second set of brightness levels greater than the first set of brightness levels.

2. The device of claim 1, further comprising a camera, wherein:
   the camera captures an image while the flash controller controls the first set of light emitters to emit light at the first set of brightness levels and control the second set of light emitters to emit light at the second set of brightness levels greater than the first set of brightness levels.

3. The device of claim 1, wherein the region surrounding the portion of the eye includes an additional portion of the eye.

4. The device of claim 1, further comprising a depth sensor, wherein:
   the flash controller determines a distance to the face using depth information obtained by the depth sensor; and
   the flash controller selects the first set of brightness levels based on the determined distance.

5. The device of claim 1, wherein the flash module comprises a diffractive element positioned to diffract light exiting the lens assembly.

6. The device of claim 1, wherein the flash module comprises a microlens array positioned over the emitter array.

7. The device of claim 1, wherein the emitter array comprises a display array.

8. A device for illuminating a field of illumination, the device comprising:
   a flash module comprising:
      an emitter array comprising a plurality of light emitters;
      a lens assembly positioned to image the emitter array onto the field of illumination; and
      a flash controller configured to control the plurality of light emitters to generate light, wherein the flash controller is configured to:
         determine that a reflected image of the device including the flash module is positioned within the field of illumination;
         select a first set of light emitters of the plurality of light emitters associated with a first portion of the reflected image that includes the flash module;
         select a second set of light emitters of the plurality of light emitters associated with a region surrounding the first portion of the reflected image;
         control the first set of light emitters to emit light at a first set of brightness levels; and
         control the second set of light emitters to emit light at a second set of brightness levels greater than the first set of brightness levels.

9. The device of claim 8, further comprising a camera, wherein:
   the camera captures an image while the flash controller controls the first set of light emitters to emit light at the first set of brightness levels and controls the second set of light emitters to emit light at the second set of brightness levels greater than the first set of brightness levels.

10. The device of claim 8, wherein the region surrounding the first portion of the reflected image includes a second portion of the reflected image.

11. The device of claim 8, further comprising a depth sensor, wherein:
    the flash controller determines a distance to the reflected image using depth information obtained by the depth sensor; and
    the flash controller selects the first set of brightness levels based on the determined distance.

12. The device of claim 8, wherein the flash module comprises a diffractive element positioned to diffract light exiting the lens assembly.

13. The device of claim 8, wherein the flash module comprises a microlens array positioned over the emitter array.

14. The device of claim 8, wherein the emitter array comprises a display array.

15. A method of illuminating a field of illumination using a flash module comprising a plurality of light emitters, the method comprising:

detecting an object positioned within the field of illumination;

identifying a first region of the field of illumination corresponding to a first portion of the detected object;

identifying a second region of the field of illumination corresponding to a second portion of the detected object; and illuminating the field of illumination using the flash module, wherein:
- the flash module illuminates the first region at a first set of illumination levels and the second region at a second set of illumination levels; and
- the second set of illumination levels is greater than the first set of illumination levels.

16. The method of claim 15, comprising:
capturing an image while illuminating the field of illumination using the flash module.

17. The method of claim 15, comprising:
selecting an illumination profile, the illumination profile having a plurality of brightness levels, wherein:
- each brightness level of the plurality of brightness levels is associated with a corresponding light emitter of the plurality of light emitters; and
- illuminating the field of illumination comprises controlling each light emitter of the plurality of light emitters to generate light with the brightness level associated with the corresponding light emitter.

18. The method of claim 17, wherein:
the plurality of light emitters comprises a first set of light emitters associated with the first region and a second set of light emitters associated with the second region; and illuminating the field of illumination comprises:
- controlling the first set of light emitters to generate light at a first set of brightness levels; and
- controlling the second set of light emitters to generate light at a second set of brightness levels greater than the first set of brightness levels.

19. The method of claim 18, wherein:
the first set of light emitters includes a first subset of light emitters and a second subset of light emitters;

the first set of brightness levels includes a first brightness level and a second brightness levels greater than the first subset of brightness level; and controlling the first set of light emitters to generate light at a first set of brightness levels comprises:
- controlling the first subset of light emitters to generate light at the first brightness level; and
- controlling the second subset of light emitters to generate light at the second brightness level.

20. The method of claim 18, wherein:
the first set of brightness levels is selected using a depth calculated between the object and the flash module.

* * * * *